No. 657,244. Patented Sept. 4, 1900.
W. K. LIGGETT.
CLUTCH.
(Application filed June 30, 1898.)

(Model.)

WITNESSES,

INVENTOR,
William K. Liggett

UNITED STATES PATENT OFFICE.

WILLIAM K. LIGGETT, OF COLUMBUS, OHIO, ASSIGNOR, BY DIRECT AND MESNE ASSIGNMENTS, TO THE KINKADE & LIGGETT COMPANY, OF SAME PLACE.

CLUTCH.

SPECIFICATION forming part of Letters Patent No. 657,244, dated September 4, 1900.

Application filed June 30, 1898. Serial No. 684,817. (Model.)

*To all whom it may concern:*

Be it known that I, WILLIAM K. LIGGETT, a citizen of the United States of America, residing at Columbus, in the county of Franklin, in the State of Ohio, have invented a certain new and useful Improvement in Clutches, of which the following is a description, reference being had to the accompanying drawings, forming part of this specification.

My invention relates to a novel automatic clutch which has been designed primarily for use in connection with hand-power elevators or lifts, such as "dumb-waiters," its purpose being when so used to automatically lock the parts in any position in which they may be left. My invention is applicable, however, to other forms of power transmission where it is desirable to lock the machinery for moving, so as to enable it to sustain loads, pressures, &c., when the power ceases to act. It is particularly applicable to instances in which it is desirable to have facility for motion in opposite directions, as in the case of the hand-power elevators referred to.

The novelty of my invention consists, in its broader sense, in an automatic clutch device interposed between the driving and driven parts and arranged to be automatically thrown into action by the driven part and to be automatically released by the driving part, whereby when the driving power ceases to act and the weight or load being acted upon then exerts its force in a reverse direction upon the driven member the latter will throw the clutch into action and automatically lock the parts in position to sustain the load at the point where the driving power ceased to act.

Having thus explained the general nature of my invention, the particular exemplification of it which I have illustrated in the accompanying drawings may now be explained by reference to said drawings, in which—

Figure 1:
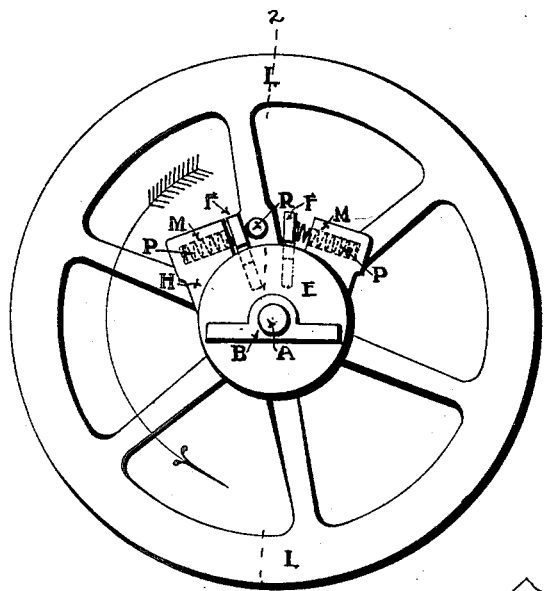
Figure 2:
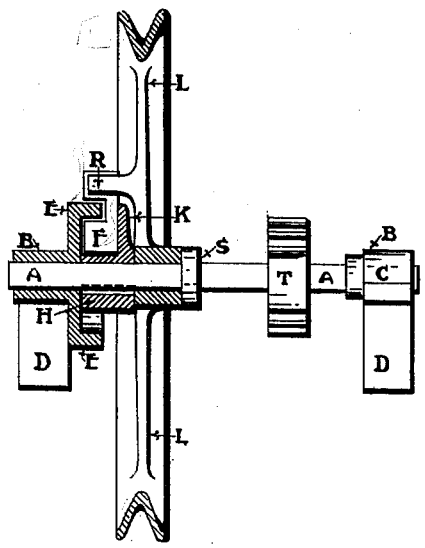
Figure 3:
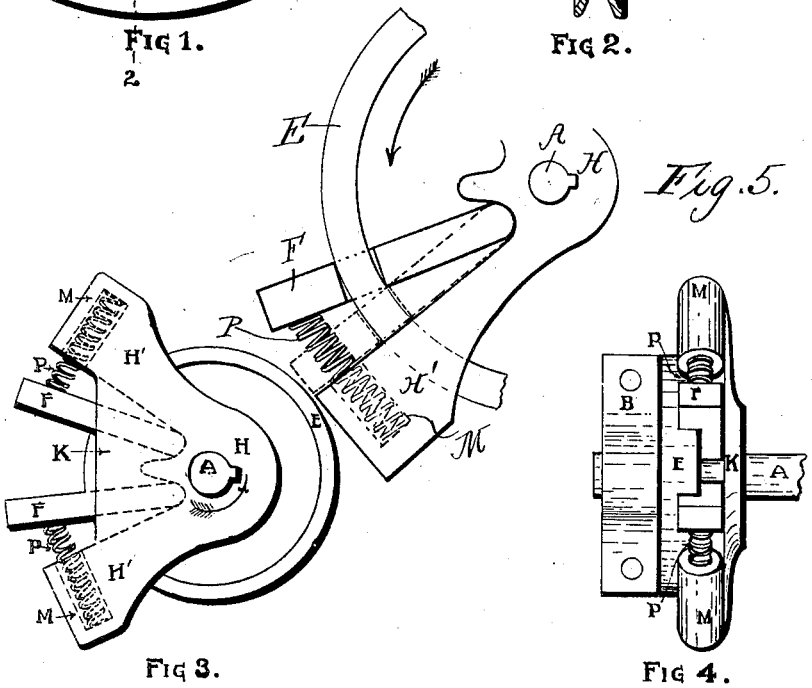

Figure 1 is an end elevation of the parts looking to the right in Fig. 2; Fig. 2, an approximately-middle vertical section on the line 2 2 of Fig. 1; Fig. 3, an enlarged detail side elevation of the clutch members, and Fig. 4 a top plan view of the parts shown in Fig. 3. Fig. 5 is a diagrammatic view showing the relative positions of the clutch-rim and clutch member.

The same letters of reference are used to indicate corresponding parts in the several views.

In the accompanying drawings, A is a shaft mounted at its opposite ends in boxes or bearings B B upon suitable supports D D.

T may be taken to represent a pinion, sheave, pulley, sprocket-wheel, or other known power-transmitting device fast upon the shaft A, and this pinion or the shaft itself, or both together, may be considered the driven member of my combination.

L represents the driving member and in the present instance consists of a grooved wheel or sheave loose upon the shaft A and adapted to be driven by a rope passing over it.

Figure 4:
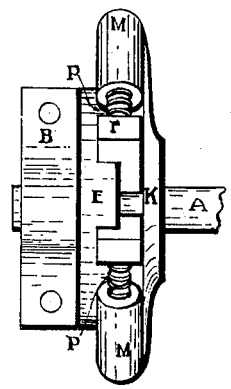

Fast upon the shaft A, against the hub of the wheel L at one side, is a collar S, while fast upon the shaft at the opposite side of the hub of the wheel is a hub H, in the present instance keyed to the shaft. The hub H is provided with two integral divergent arms H' H', connected by a web or flange K. (Best shown in Fig. 3.) This hub and its divergent arms and connecting web or flange I term the "spider," and the purpose of this so-called "spider" is to furnish a receptacle and support upon the shaft A for two clutch blocks or dogs F F, which are seated in radial slots or recesses in the spider and supported at their right-hand sides (in Fig. 2) by the web or flange K. At their opposite sides the blocks or dogs F F are provided with recesses or notches which embrace the circumferential flange or rim of a disk E, which in the present instance is rigidly secured to or formed integral with the left-hand bearing B of the shaft A, Fig. 2. The outer ends of the arms H' H' are formed into cylindrical housings M, which are bored to receive coiled springs P, whose outer ends bear against the outer sides of the respective clutch blocks or dogs F F, as shown in Figs. 1, 3, and 4.

The clutch blocks or dogs F F fit loosely at their inner ends in the seats provided for them in the hub or spider, so that their outer ends are capable of limited play back and forth circumferentially of the shaft independently of the spider, Fig. 3. The notches in the dogs F F loosely embrace the flange or rim of the disk E and are so shaped and located that when either dog is pressed against the tension of its spring P toward the adjacent arm H' of the spider the sides of its notches will not bind on the flange E, and when forced away from the arm H' and into its normal position by its spring the sides of the notch will bite or bind on the inner and outer surfaces of the flange E, as shown in Fig. 5 of the drawings. Thus in Fig. 5 if it be attempted to turn the shaft A and spider in the direction of the arrow the inner end of the lower dog F will be moved downward, while its outer end will be held up by the spring P, so that the opposite walls of its notch will be caused to bind upon the rim and lock the parts from movement. Likewise, if it be attempted to turn the shaft and spider in the opposite direction the inner end of the upper dog F will be moved upward, while the upper spring P will press its outer end downward, and thereby lock this dog to the rim and hold the parts from movement. When in their normal position, as in Fig. 3, each dog is free to travel around the rim in what may be called a "forward" direction—i. e., in a direction toward its fellow dog—but becomes locked from movement when it is attempted to turn the shaft and spider in the opposite direction. Now it will be understood from the foregoing that if when it be desired to turn the shaft and spider in the direction of the arrow in Fig. 3 the outer end of the lower dog F were pressed downward toward the lower arm H' and the spring P pressed within its housing, such dog would be free to travel around the rim and would not become locked thereto, and that likewise, if when it were desired to turn the parts in the opposite direction the outer end of the upper dog were pressed upward toward the upper arm H', compressing the upper spring P within its housing, the parts would be left free to turn in that direction. I have provided means for thus moving the outer ends of the dogs F F toward the respective arms H' H', against the resistance of the springs P P, and thereby releasing the parts, so that they may be freely turned in one direction or the other, as the case may be, such means consisting of a stud or finger R, projecting from the driving-wheel L, between the dogs F F, as shown in Figs. 1 and 2. When the driving-wheel is turned in one direction or the other, this stud will contact with the outer end of the dog F which stands in its path and force it forward toward the housing M of the spring which bears against it, compressing the spring within the housing and freeing the dog from binding contact with the rim. The opposite dog being at all times free to move in such direction, it follows that when the first-mentioned dog has been thus released the driving-wheel is free to turn the spider and shaft A forward with it, the driving connection between the parts being effected by the contact of the stud R with the dog F. Thus in Fig. 1 the driving-wheel L is being turned in the direction of the large arrow and its stud R has engaged the outer end of the left-hand dog F and forced it to the left against the end of the housing M on the outer end of the arm H' and maintains it in this released position as the parts are turned forward in the direction of the arrow. The opposite or right-hand dog F is free in its normal position to travel forward in this direction, but not in the reverse direction. If, therefore, the driving-power applied to the wheel L is removed or ceases to act and the weight or load upon the shaft A tends to turn the latter and the parts carried by it backward, they will be instantly locked from movement by the engagement of the right-hand dog F with the flange or rim of the disk E. So if the driving-wheel L be turned in a direction opposite that indicated by the large arrow in Fig. 1, the pin R would contact with the right-hand dog F and force it to the right against the housing M and maintain it in this released position while the parts were turned forward in such direction, and when in such case the driving power ceased to act and the wheel L was released the left-hand dog F would prevent any backward movement of the spider and shaft A under the load upon the latter.

It will be understood from the foregoing description that the parts are always normally locked from movement as respects any load upon the shaft A or driven member acting in either direction or in respect to power applied in either direction to the driven member, but that the shaft and driven member may be turned at will in either direction by power applied to the driving member, the application of power to such driving member serving at the initial movement of the latter to break the clutch which is holding the driven member from movement.

To illustrate a simple application of my invention, if it be assumed that an endless rope is placed over the driving-sheave L, as in the case of a hand-power lift, and the rope supporting the weight to be lifted be attached to the shaft A and wound around the same or around a drum or sheave upon the shaft, it will be seen that by pulling upon the rope passing over the sheave L and turning the latter in either direction the weight carried by the shaft A may be raised or lowered to any desired point and will be automatically supported wherever left, both between pulls upon the rope and at the end of the operation. In turning the driving member in a direction to lift the weight the driven member will be automatically locked to support the weight at the end of each upward step, while in turning the driving member in the opposite direction to lower the weight the driven member can travel no faster than the driving member, and thus the speed of the driven member will be controlled as desired by the power applied to the driving member.

As stated at the beginning of the specification, my invention is not restricted in its application to the particular use for which it has been primarily designed, and it therefore follows that it is likewise not restricted in its broader scope to the construction and arrangement of parts which have been illustrated and described, so long as a construction and arrangement of parts are employed which perform the essential functions of my device.

Having thus fully described my invention, I claim—

1. The combination of a driven member, a clutch-spider carried thereby, two clutch members carried on said spider, a fixed clutch-rim with which said clutch members are adapted to engage to hold the driven member, a driving member, and a part carried by the same located between said clutch members and adapted to engage one clutch member and release it from the clutch-rim when the driving member is moved in one direction and to engage the other clutch member and release it when the driving member is moved in the opposite direction, substantially as described.

2. The combination of a driven member, a clutch-spider carried thereby, a fixed clutch-rim, a clutch member, means for normally holding said clutch member in engagement with said rim to hold the driven member, a driving member, a part operated by the same adapted to engage said clutch member and release the same from engagement with the clutch-rim, substantially as described.

3. The combination of a driven member, a clutch-spider carried thereby, clutch members movable on said spider, a fixed clutch-rim with which said clutch members are adapted to engage to hold the driven member, a driving member and a part carried by the same adapted to engage one of said clutch members when the driving member is moved in one direction and the other clutch member when the driving member is moved in the other direction and through the same and said clutch-spider operate the driven member, substantially as described.

4. The combination of a driven member, a driving member, a fixed clutch-rim, a clutch-spider fixed to the driven member, movable clutch-blocks carried by said clutch-spider and adapted to engage said clutch-rim, springs acting to force said clutch-blocks toward each other, a part carried by the driving member between said clutch-blocks said part adapted to engage one clutch-block when moved in either direction and disengage the same from said clutch-rim, substantially as described.

5. The combination of the shaft A, the driving-wheel L loosely mounted thereon and having the projection R, the fixed clutch-rim E, the hub H fast upon the shaft A and having the divergent arms H' H', the clutch blocks or dogs F F seated in the hub H and provided with the notches embracing the fixed clutch-rim, and the springs P P interposed between the arms H' H' and dogs F F, substantially as described.

6. The combination of the shaft A, the driving-wheel L loose thereon and provided with the projection R, the fixed clutch-rim E, the hub H fast upon the shaft A and provided with the divergent arms H' H' and connecting web or flange K, the clutch blocks or dogs F F seated in the hub H and supported at one side by the web K and provided with the notches embracing the clutch-rim, and the springs P P seated in the housings M M on the outer ends of the arms H' H' and bearing against the dogs F F, substantially as described.

WILLIAM K. LIGGETT.

Witnesses:
 WM. H. BULLOCK,
 OWEN G. ROBERTS.